United States Patent [19]

Svendsen

[11] 4,354,667

[45] Oct. 19, 1982

[54] CRAB POT LINE HAULER

[75] Inventor: Robert A. Svendsen, Seattle, Wash.

[73] Assignee: Marine Construction & Design Co., Seattle, Wash.

[21] Appl. No.: 48,059

[22] Filed: Jun. 13, 1979

[51] Int. Cl.³ .............................................. B66D 1/08
[52] U.S. Cl. .................................. 254/332; 254/334; 254/361; 254/371; 254/380; 254/382; 254/383; 254/389; 43/8
[58] Field of Search ............... 254/288, 291, 315, 329, 254/333, 334, 331, 332, 361, 371, 389, 374, 380, 382, 383, 403, 411, 413, 415; 43/8, 4.5

[56] References Cited

U.S. PATENT DOCUMENTS

| 519,984 | 5/1894 | Browne | 254/403 |
|---|---|---|---|
| 1,657,187 | 1/1928 | Whittlesey | |
| 2,646,255 | 7/1953 | Bowman | |
| 2,947,516 | 8/1960 | Jackson | 254/332 X |
| 3,032,322 | 5/1962 | Lawrence | |
| 3,034,767 | 5/1962 | Gordon | 254/327 |
| 3,750,970 | 8/1973 | Tremoulet, Jr. | 254/382 X |
| 3,807,696 | 4/1974 | Brda | 254/411 X |
| 3,964,730 | 6/1976 | Demmert | 254/371 |
| 4,005,852 | 2/1977 | Schmitmeyer | 254/383 X |

Primary Examiner—John M. Jillions
Attorney, Agent, or Firm—Christensen, O'Connor, Johnson & Kindness

[57] ABSTRACT

The improved crab pot line hauler's drive motor, sheave and associated line guide means having a common support are mounted as a composite unit on pivotal support bearings that permit the unit to revolve freely about a fixed bearing axis in addressing itself to the incoming line being hauled and that restrain the unit against other bodily motion. Placement of the center of mass of the hauler unit at or closely adjacent to such pivot bearing axis assures its relatively steady orientation in operative relation to the incoming line with minimal line deflection force acting on it to do this. Polar moment of inertia about such bearing axis being also made relatively small by such mounting system, quickness of response of the unit to changing line approach direction is also achieved, a major advantage in stormy weather.

23 Claims, 7 Drawing Figures

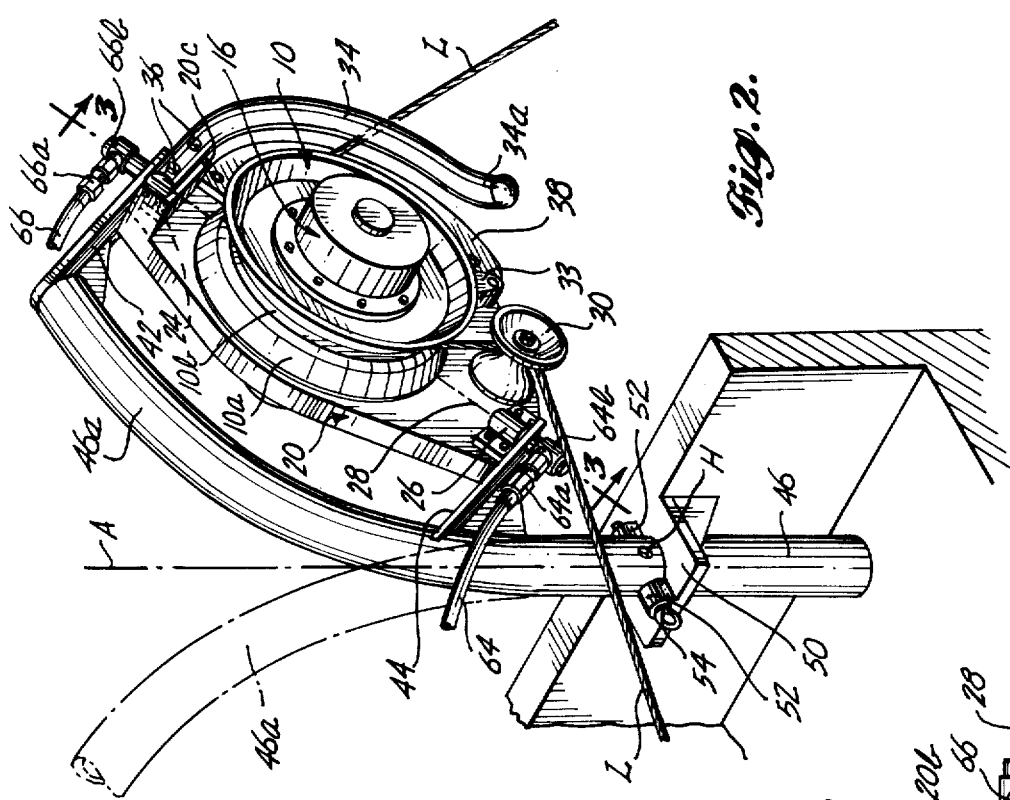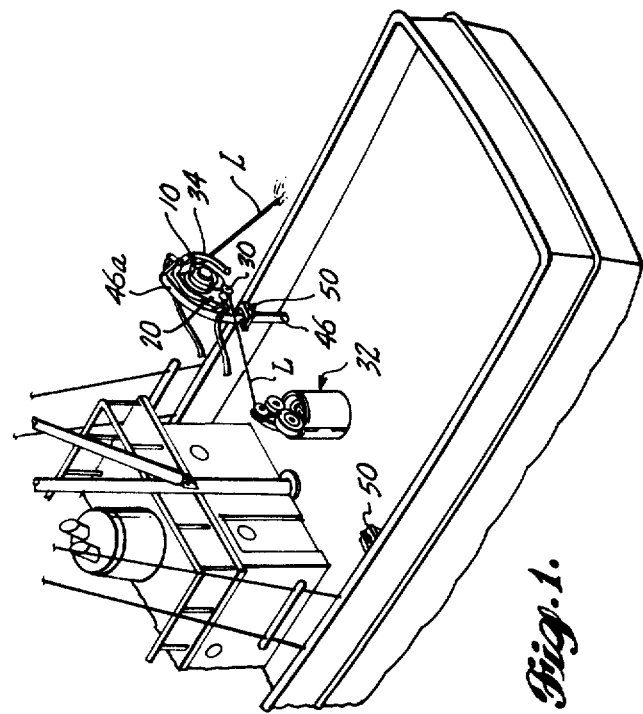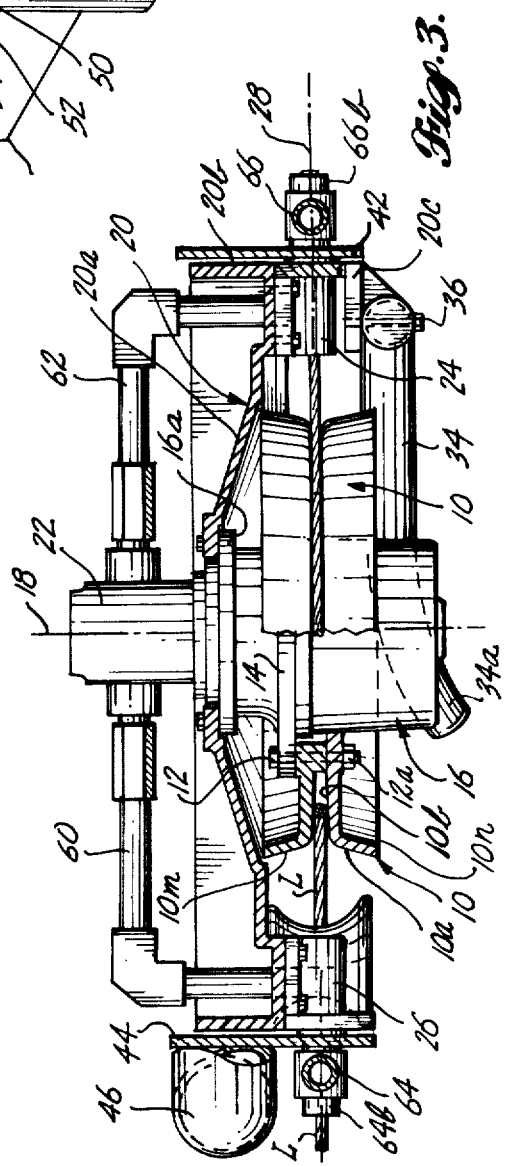

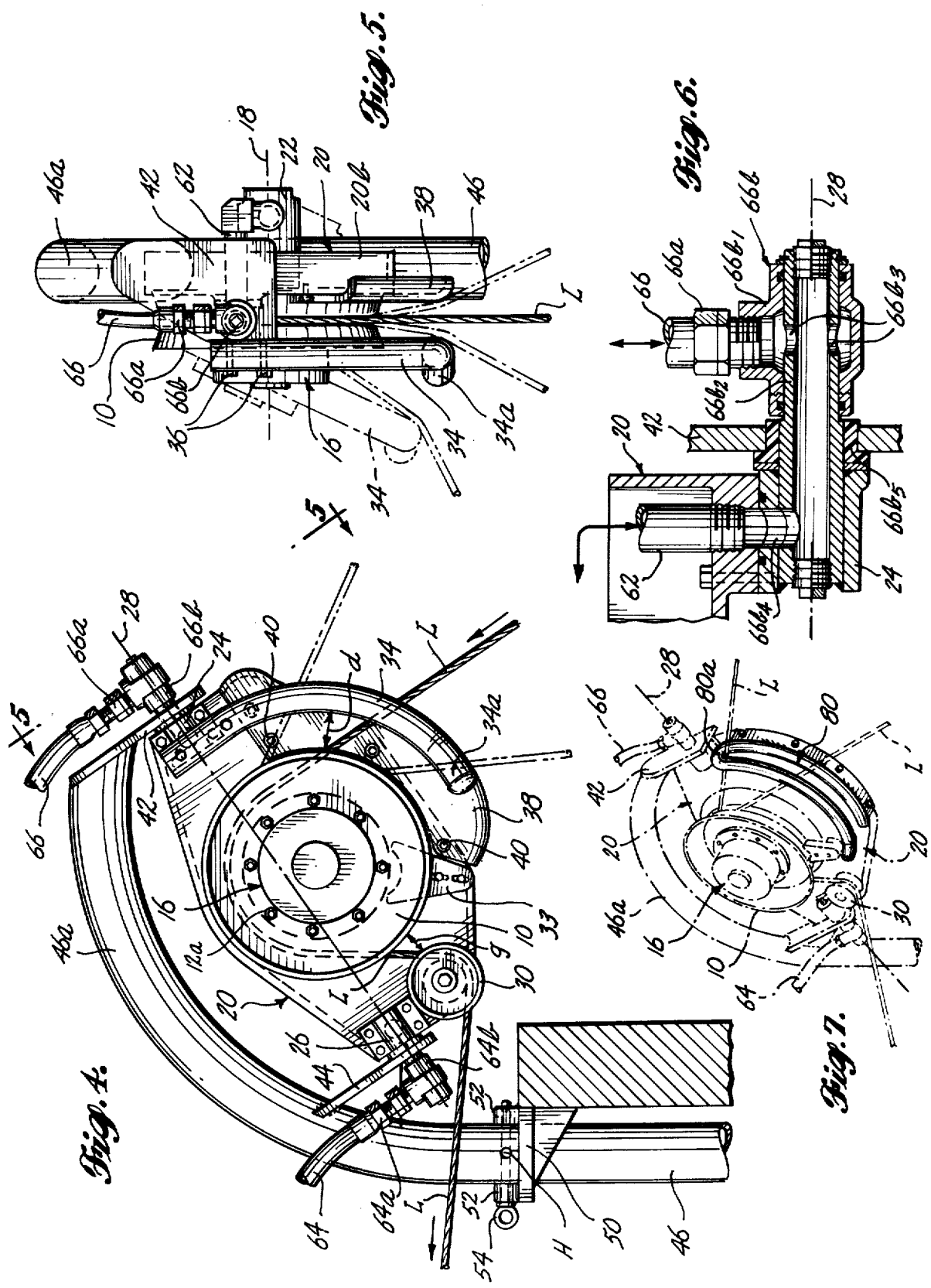

CRAB POT LINE HAULER

BACKGROUND OF THE INVENTION

This invention relates to an improved crab pot line hauler and more particularly to improvements that retain the versatile effectiveness of the former pendulously mounted haulers in common usage, while avoiding the dangers posed by the latter due to swinging about under heavy sea conditions, or the alternative inconvenience of restraining the pendulous mass against such motions through use of snubbers or other connecting elements that make the hauler's use more awkward. The invention is herein illustratively described by reference to the presently preferred embodiment thereof; however, it will be recognized that certain modifications and changes with respect to details may be made therein without departing from the essential features involved.

The most commonly used crab pot line hauler in the King crab fishery at present utilizes a sheave assembly including hydraulic drive motor, hydraulic connecting hoses and line guides pendulously suspended from a davit as a free swinging and free swiveling unit. The pot warp or line is wedged in a vee-shaped groove in the hauler sheave in order to bring in the line. Gordon U.S. Pat. No. 3,034,767 illustrates such a device. Because of the great forces required to haul in a large and heavy trap loaded with catch the hauler unit itself must be powerful and sturdy, hence becomes quite massive and thereby a threat to personnel and equipment when swinging about in heavy weather. Restraining lines or snubbers secured to the hauler in order to limit its range and/or violence of swinging motion must nevertheless allow it to swivel and swing freely to the extent necessary in order to address itself to the incoming line. Thus, even with such restraints the hauler still tends to swing about inconveniently at times, and the hauler restraining means can hinder convenient access to the sheave in placing a bight of pot line over the sheave and into its groove. It is also desirable for reducing line abrasion and wear as well as for efficient operation of the hauler that the hauler be self-orienting in relation to the line with minimum line deflection force acting on it required in order to maintain that orientation and with the capability of responding quickly to changes of line direction such as during heavy sea conditions when the vessel is rolling and pitching through wide angles. This invention is directed to a hauler that achieves these objectives in a serviceable, reliable mechanism that is not only safer for the operator and for the deck equipment on the vessel, but that is easier to use, minimizes wear in the pot lines being hauled and facilitates insertion and removal of pot lines in relation to the hauler sheave.

Still another object of this invention is to devise a convenient and safely usable crab pot line hauler which is mechanically simple in its construction, easily maintained and which requires no special restraints or snubber ties in order to hold it in working position. Still another object is to devise such a crab pot line hauler that lends itself to mounting in a manner and by a means that enables it to be moved inboard into a stowed position for travel and as quickly deployed into an outboard or over-rail position for use.

BRIEF DESCRIPTION

In accordance with this invention, the improved line hauler comprises a sheave assembly that includes a power driven vee-grooved hauler sheave, associated sheave drive motor and line guide means mounted together as a unit in cooperable relationship on a common support. The unitized hauler sheave assembly unit is carried by a structural base preferably in the form of a davit-like post having an overarching upper end portion with depending brackets that form a yoke carrying alined pivot bearings which pivotally mount the common support of the assembly between them. The fixed bearings restrain the unitized hauler assembly against all bodily motion except pivotal motion about the bearing axis. The sheave assembly is formed with its center of mass located in the vicinity of the pivot axis. Accordingly while the device is free to pivot in addressing itself to the incoming line in response to deflection forces exerted by line tension, motion of the vessel in rolling and pitching does not materially disturb or influence the positioning of the hauler assembly in operation. Furthermore, the hauler assembly tends to maintain a stable position facilitating insertion and removal of line in relation to the hauler sheave.

Proximate positioning of the center of mass of the hauler assembly in relation to the fixed pivot axis defined by the mounting base also greatly reduces polar moment of inertia about the pivot axis of the mass of the hauler assembly and increases its reorientation responsiveness to changes of line direction relative to heading of the vessel such as during rolling and pitching of the vessel in heavy seas.

By pivoting the davit support member about its vertical axis, the assembly may be moved easily inboard into a stowed position or outboard into an operative position and locked in either position.

These and other features, objects and advantages of the invention will become more fully evident as the description proceeds by reference to the accompanying drawings illustrating the presently preferred mode or embodiment of carrying out the invention.

BRIEF DESCRIPTION OF DRAWINGS

FIG. 1 is an isometric view of the aft portion of a crab fishing vessel with the novel crab pot line hauler in one form mounted on the starboard side in operative position and with an automatic pot line coiler cooperating with the hauler at a location between the sides.

FIG. 2 is an enlarged prospective view of the line hauler device shown in FIG. 1.

FIG. 3 is a view taken partly in section on an inclined plane, along line 3—3 in FIG. 2.

FIG. 4 is a side elevation of the hauler shown in FIG. 2.

FIG. 5 is a view taken on an inclined pane, along line 5—5 in FIG. 4.

FIG. 6 is an enlarged fragmentary sectional detail view of the pivotal joint at the end of support plate 20 mounted on support bracket 42.

FIG. 7 is an isometric view of the hauler with a modified fairlead device.

DETAILED DESCRIPTION OF DRAWINGS

In the embodiment of FIGS. 1-5 the improved hauler includes sheave 10 made in two annular inner and outer halves or side parts 10m and 10n. When clamped together and against drive flange 14 that supports them by stud bolts 12 and nuts 12a, the sheave sides form a wide angle entrance groove 10a at its periphery and a narrow angle line-receiving groove 10b into which a running bight of crab pot line L may be wedged in order to gain hauling traction on the line during sheave rotation about its central axis 18. Drive flange 14 comprises the output member of an 18.71:1 planetary reduction gear drive unit 16. The latter has a base flange 16a bolted to the dished central portion 20a of support plate 20. Hydraulic drive motor 22 drivingly connected to reduction gear unit 16 is mounted in coaxial alignment therewith and with the sheave 10.

Support plate 20 has a stiffener flange 20b extending around its perimeter. At opposite locations it carries aligned bearing blocks 24 and 26 adapted to engage and retain pivot shaft 66b2 (see FIG. 7) that mounts the support plate 20 to pivot on the axis 28 transverse to the hauler sheave rotation axis 18.

The coaxially related motor and reduction gear assembly is not only compact in form but is so mounted that one portion (preferably the gear unit 16) projects beyond the outer side of sheave 10 (through its central opening) and the complemental portion counterbalances it by projecting beyond the inner side of the sheave 10. The counterbalancing arrangement is such that when combined with the weight distribution of associated components forming parts of or carried by support plate 20, the system has a center of gravity and also a center of mass (i.e., for purposes of polar moment of inertia) located at or proximate to the transverse pivot axis 28 of support plate 20. Preferably the center of gravity is placed slightly below such pivot axis with the sheave's rotational plane substantially vertical (i.e., normally positioned to receive the bight of line L). However, if it is not so located, so as to return the sheave to its normal upright position by gravity, return springs or other means (not shown) may be used to effect such return positioning after displacement forces exerted by line tension during hauling have been removed.

Also mounted on the sheave side of the support plate 20 in coplanar relationship with the hauler sheave 10 is a line guide sheave or roller 30 around which line emerging from the groove of the hauler sheave is deflected and guided in passing from the hauler to the line coiler 32 if one is used. The sheave assembly carried by the mounting plate 20 also includes what is referred to in the art as a line splitter 33, i.e., an element that projects radially into and occupies a position in the deeper reaches of the hauler sheave groove 10b so as to deflect line outwardly from the groove in case it tends to stick there. This also is a conventional element of a power-driven crab pot line hauler.

Furthermore, the hauler sheave assembly carried by the support plate 20 also includes means to direct the incoming line being hauled into the sheave groove despite varying divergences of line direction from the instantaneous rotational plane of the hauler sheave. Such incoming line guide means comprises a cantilevered deflector arm 34 which in this instance is anchored by connecting bolts 36 at its upper end to bearing block 24 on the support plate 20. Line deflector arm, around which the incoming line can slide in its approach to hauler sheave 10, projects generally downwardly in an arcuate curve that parallels and lies radially outward from the rim of the hauler sheave 10 approximately in alignment with the side of the hauler sheave 10 opposite the support plate 20. A radial clearange gap "d" between the rim of the hauler sheave 10 and the line deflector arm 34 is provided for the convenient manual lateral insertion and removal of a running bight of pot line into and from the hauler sheave 10 during use of the apparatus. A clearance gap "g" is also provided for a similar reason between the offbear guide sheave 30 and hauler sheave 10. The free lower end portion of guide arm 34 terminates in a bend, curving away from the hauler sheave so as to form the effect of a flared entrance as a further convenience to the operator in inserting and removing pot line from the hauler sheave.

The guide arm 34 extends through or subtends a hauler sheave arc of at least approximately 90°, such arc extending from a point above the horizontal to a point near the bottom extremity of the hauler sheave. The arcuate extent of the guide arm 34 is sufficient for it to remain functional throughout rolling and pitching of the vessel and for all incline angles of the line itself which may occur during hauling.

Also mounted on support 20, opposite the guide arm 34, is a companion line guide plate 38 having a smoothly rounded lower outer edge following a curve generally parallel to that of arm 34. As best shown in FIG. 5, the guide plate 38 mounted on the support plate 20 by bolts 40 cooperates with arm 34 to define a fairlead or entrance slot for guiding line to hauler sheave 10 whether the hauler is mounted to operate on the starboard side or on the port side of the vessel and whether the vessel is being operated so that the line comes in from an aft direction or from a forward direction.

The unitized hauler sheave assembly includes the hauler sheave 10, drive motor 22, reduction gear unit 16, guide roller 30, splitter 32, and guide elements 34 and 38 all carried by the common support 20. This unitized assembly is effectively caged in a yoke defined by pivot mount brackets 42 and 44 which are welded or otherwise secured on the underside of the overarching upper end portion 46a of the davit-like post 46 as shown. The post 46 in turn is mounted in upright position at the rail of the fishing vessel with its lower end revolvably secured in a deck aperture or on an upright shaft (not shown) projecting up from the deck of the vessel and braced at rail height by bracket 50. The post can be locked in any of different selected positions rotated about its vertical axis A using any suitable means such as a locking pin 54 adapted to engage aligned sockets 52 on bracket 50 and to pass through any of differently oriented sets of aligned holes through post 46 as shown. Thus the hauler may be deployed and locked in operating position projecting outboard to overlie the rail of the vessel, or by pulling the pin 54 it may be brought inboard by turning the post 46 into any of different stowed positions defined by the number and angular positions of the locking pin hole sets in the post. Likewise, different operating positions may also be established for the hauler so that the pivot axis 28 may be positioned in differently oriented vertical planes if desired.

As shown in FIGS. 3 and 6, hydraulic motor 22 is connected to pressure line 60 and return line 62. These in turn are coupled to hydraulic hoses 64 and 66 through similar fittings 64a and 66a respectively that connect to concentric rotary duct joints 64b and 66b. Rotary duct joint 66b as shown in FIG. 6 comprises a hollow elbow fitting 66b1 (shown for convenience, rotated 90 degrees about axis 28 from its position in FIG. 5) in which a tubular support shaft 66b2 is journalled and sealed to rotate. Shaft 66b2 has fluid passage openings 66b3 in communication with hose 66 and one or more similar openings 66b4 in communication with pipe 62. The pipe 62 is welded into the block 24 which is bolted to support plate 20. An antifriction bearing collar 66b5 is received rotationally in an aperture in base mounting bracket 42. This assembly permits the support plate 20 to freely pivot about axis 28 relative both to the hose 66 and bracket 42 and permits the hose to assume and retain its most relaxed posture about axis 28 independently of pivoting of the support plate 20 and the sheave and associated drive assembly it carries. Thus, pivoting of the sheave assembly about its pivot axis 28 is accomplished without placing stress in the hydraulic hoses 64 and 66 and without varying stress of those hoses having an effect upon the ease with which the line deflection guides 34 and 38 are able to maintain the plane of the hauler sheave 10 aligned with the incoming pot line L with minimal line deflection force required for the purpose.

In the preferred embodiment as shown, the hauler assembly is mounted with its pivot axis 28 inclined outwardly by an angle of approximately 30° more or less. However, this inclination angle is not critical. By redesign the apparatus can be made operable, although it is believed not as satisfactorily so, with the incline angle of the axis 28 ranging from substantially horizontal to substantially vertical. In any case, the unitized pivotally mounted hauler sheave assembly is so designed and mounted that its center of mass is proximate to the pivot axis 28 and preferably slightly below that axis so that gravity tends to maintain the hauler sheave in a vertical plane until line forces modify its position during hauling. The sheave assembly is made as light in weight as possible, consistent with loading requirements so that its mass is minimized. As a result, and because its center of mass is placed close to its pivot axis, the polar moment of inertia of the assembly about the pivot axis 28 is also minimized.

It will also be evident that by thus caging the unitized hauler assembly between fixed pivot bearings and by locating the center of mass adjacent to its pivot axis the hauler assembly does not tend to swing about uncontrollably with rolling and pitching of the vessel. This greatly improves the safety and efficiency of its use during busy hauling operations wherein lines are frequently engaged and disengaged by manual operation in bringing in a string of traps. Moreover, during hauling the hauler is more readily and sensitively able to keep itself aligned with the incoming line with very little lateral line deflection force required from the line itself acting on the fairlead deflectors or guides 34 and 38 in order to do this. Reduced abrasion wear of the lines passing through the hauler is a further benefit.

It will be further evident that the fairlead means of the hauler required to guide the line into the hauler sheave from an outboard location may vary and still achieve the desired directing action on the line so as to keep it centered in the sheave groove while providing a reaction surface for exerting realignment torque on the sheave assembly in response to changing relative directions of line.

FIG. 7 depicts a hauler with revised input fairlead or line guide. Parts similar to those shown in the previously described form bear corresponding reference numerals. In this revised design the line guide comprises an inverted U-shaped member 80 the curved legs of which replace the cantilever guide arm 34 and opposite guide 38 of the previously described embodiment. The upper or connecting portion 80a serves a stop or limiting guide that protects the line L against abrasion on the upper parts of the support in case the vessel heels over to an extreme degree with the line coming in from a nearly horizontal direction.

These and other variations may be employed in the design and construction of the device, such as the kind, placement and form of the drive means used for the hauler sheave 10, and the form of the common support for the hauler elements. What is claimed to be novel is, therefore, not to be interpreted as confined to the details of illustration depicted and described herein.

The embodiments of the invention in which an exclusive property or privilege is claimed are defined as follows:

1. A line hauler for hauling crab pots and the like on a fishing vessel, comprising a sheave assembly that includes a power-driven V-grooved hauler sheave and associated sheave drive motor and line guide means mounted together as a unit in cooperable relationship on a common support permitting driven rotation of said sheave by said motor about a sheave axis, a structural base adapted for mounting said common support with the sheave assembly in operative position on a fishing vessel, said base having pivot bearing means fixed thereon and mounting said support to permit said sheave assembly to pivot freely about a fixed pivot axis extending transverse to the sheave axis while restraining the support against other bodily motion relative to said base, said pivot axis being angled to the vertical, and the sheave assembly being formed with its center of mass offset downwardly from said pivot axis.

2. The hauler defined in claim 1 wherein the support bearing means comprises bearing elements fixed on the mounting base in mutually spaced alignment for pivotally mounting said common support extending between them.

3. The hauler defined in claim 1 wherein the line guide means comprises a fairlead fixed on the support in a position spaced radially outward from the sheave and also from the sheave assembly pivot axis so as to guide incoming line to the sheave from varying approach directions and in so doing to exert pivotal torque on said common support maintaining the sheave aligned with the incoming line.

4. The hauler defined in claim 3 wherein the line guide means fairlead comprises an elongated line deflector arm substantially paralleling the sheave's periphery and cantilevered downwardly to a free end spaced outwardly of the sheave, the length of said arm subtending an arc about the sheave's rotational axis substantial coextensive with the arcuate range of incidence of line incoming to the sheave assembly from the varying relative directions of haul.

5. The hauler defined in claim 4 wherein the line guide means further includes a lead-off guide positioned on the common support on the same side of the pivot axis as the fairlead and at an angular position about the sheave axis so as to lead line away from the sheave after passing around that portion of the sheave that is engaged by the incoming line during hauling.

6. The hauler defined in claim 5 wherein the line guide means further includes a line splitter comprising an element fixed on the common support position to occupy the sheave groove and strip line out of the groove at a location between the lead-off guide and the fairlead.

7. The hauler defined in claim 2 wherein the common support comprises a substantially plate-like member extending substantially edgewise between and supported by the bearing elements, with the sheave positioned on a first side of said plate-like member and the sheave drive motor positioned on the opposite side of said plate-like member.

8. The hauler defined in claim 7 wherein the mounting base comprises a vessel-mounted davit-like post structure having on its upper end an overarching arm portion with members depending therefrom forming a rigid yoke, said members mounting the respective bearing elements in positions of mutual alignment on a pivot axis thereby defined for the sheave assembly support that is inclined outwardly of the fishing vessel with the vessel on even keel.

9. The hauler defined in claim 8 wherein the line guide means comprises a fairlead fixed on the support in a position spaced radially outward from the sheave and also from the sheave assembly pivot axis so as to guide incoming line to the sheave from varying approach directions and in so doing to exert pivotal torque on said common support maintaining the sheave aligned with the incoming line.

10. The hauler defined in claim 9 wherein the line guide means fairlead comprises an elongated line deflector arm substantially paralleling the sheave's periphery and cantilevered downwardly to a free end spaced outwardly of the sheave, the length of said arm subtending an arc about the sheave's rotational axis substantially coextensive with the arcuate range of incidence of line incoming to the sheave assembly from the varying relative directions of haul.

11. The hauler defined in claim 10 wherein the line guide means further includes a lead-off guide positioned on the common support on the same side of the pivot axis as the fairlead and at an angular position about the sheave axis so as to lead line away from the sheave after passing around that portion of the sheave that is engaged by the incoming line during hauling.

12. The hauler defined in claim 11 wherein the line guide means further includes a line splitter comprising an element fixed on the common support in position to occupy the sheave groove and strip line out of the groove at a location between the lead-off guide and the fairlead.

13. The hauler defined in claim 1 wherein the support bearing means comprises bearing elements fixed on the mounting base in mutually spaced alignment for pivotally mounting said common support extending between them.

14. The hauler defined in claim 13 wherein the line guide means comprise a fairlead fixed on the support in a position spaced radially outward from the sheave and also from the sheave assembly pivot axis so as to guide incoming line to the sheave from varying approach directions and in so doing to exert pivotal torque on said common support maintaining the sheave aligned with the incoming line.

15. The hauler defined in claim 14 wherein the line guide means fairlead comprises an elongated line deflector arm substantially paralleling the sheave's periphery and cantilevered downwardly to a free end spaced outwardly of the sheave, the length of said arm subtending an arc about the sheave's rotational axis substantially coextensive with the arcuate range of incidence of line incoming to the sheave assembly from the varying relative directions of haul.

16. The hauler defined in claim 15 wherein the line guide means further includes a lead-off guide positioned on the common support on the same side of the pivot axis as the fairlead and at an angular position about the sheave axis so as to lead line away from the sheave after passing around that portion of the sheave that is engaged by the incoming line during hauling.

17. The hauler defined in claim 16 wherein the line guide means further includes a line splitter comprising an element fixed on the common support position to occupy the sheave groove and strip line sticking in the sheave groove at a location between the lead-off guide and the fairlead.

18. The hauler defined in claim 14 wherein the line guide means comprises an inverted U-shaped member having downwardly extending arms substantially paralleling and respectively extending along and spaced radially outward from opposite sides of the sheave's periphery, and a portion interconnecting the upper ends of said arms, one of said arms being mounted on said support and the other of said arms being cantilevered downwardly to a free end spaced from the sheave, both arms subtending an arc about the sheave's rotational axis substantially coextensive with the arcuate range of incidence of line incoming to the sheave assembly from the varying relative directions of haul.

19. The hauler defined in claim 1 wherein the sheave assembly further includes a reduction gear drive unit operatively interconnecting the sheave and the drive motor in coaxial alignment, said sheave having a central aperture, said drive unit and drive motor comprising a coaxially aligned drive combination extending through said central aperture such that a portion lies on one side of the sheave and another portion lies on the relatively opposite side of the sheave.

20. The hauler defined in claim 19 wherein the bearing means comprises mutually spaced bearing elements and the common support comprises a substantially plate-like member extending substantially edgewise between and supported by the bearing elements, with the sheave positioned on a first side of said plate-like member and the sheave drive motor positioned on the opposite side of said plate-like member.

21. The hauler defined in claim 19 wherein the bearing means comprises mutually spaced bearing elements and the common support comprises a substantially plate-like member extending substantially edgewise between and supported by the bearing elements, with the reduction gear drive unit mounting the sheave positioned on a first side of said plate-like member, and the sheave drive motor mounted on and positioned on the opposite side of the plate-like member.

22. The hauler defined in claim 21, wherein the sheave comprises opposing side portions, including an outer side portion, opposite the plate-like member, removably secured to the opposing inner side portion adjacent the plate-like member.

23. The hauler defined in claim 22, wherein said inner side portion is mounted directly on the reduction gear drive unit and the outer side portion is separately removable from the inner side portion.

* * * * *